(12) United States Patent
Fechner et al.

(10) Patent No.: US 7,241,459 B2
(45) Date of Patent: Jul. 10, 2007

(54) POLYMERS CONTAINING BIOACTIVE GLASS WITH ANTIMICROBIAL EFFECT

(75) Inventors: Joerg Hinrich Fechner, Mainz (DE); Jose Zimmer, Ingelheim (DE); Roland Schnabel, Hofheim/Ts (DE); Rupert Schnell, Worms (DE)

(73) Assignee: Schott Ag, Mainz (DE)

( * ) Notice: Subject to any disclaimer, the term of this patent is extended or adjusted under 35 U.S.C. 154(b) by 257 days.

(21) Appl. No.: 10/477,098

(22) PCT Filed: May 7, 2002

(86) PCT No.: PCT/EP02/04991

§ 371 (c)(1),
(2), (4) Date: Nov. 7, 2003

(87) PCT Pub. No.: WO02/090278

PCT Pub. Date: Nov. 14, 2002

(65) Prior Publication Data

US 2004/0137075 A1 Jul. 15, 2004

(30) Foreign Application Priority Data

May 8, 2001 (DE) ............... 101 22 262

(51) Int. Cl.
| | |
|---|---|
| *A61K 9/14* | (2006.01) |
| *A61K 33/43* | (2006.01) |
| *A61K 33/14* | (2006.01) |
| *A61K 33/08* | (2006.01) |
| *A61K 33/00* | (2006.01) |
| *A61K 31/695* | (2006.01) |
| *A61K 31/69* | (2006.01) |
| *A61K 31/66* | (2006.01) |
| *A01N 25/00* | (2006.01) |
| *A01N 59/26* | (2006.01) |
| *A01N 59/14* | (2006.01) |
| *A01N 59/08* | (2006.01) |
| *A01N 59/00* | (2006.01) |
| *A01N 55/00* | (2006.01) |
| *A01N 55/08* | (2006.01) |
| *A01N 57/00* | (2006.01) |

(52) U.S. Cl. ............ 424/489; 424/405; 424/601; 424/657; 424/688; 424/724; 514/63; 514/64; 514/75

(58) Field of Classification Search ............ 424/601, 424/602, 606, 657, 665, 688, 692, 724; 501/58; 523/122; 514/494, 495, 499, 951, 63, 64, 514/75

See application file for complete search history.

(56) References Cited

U.S. PATENT DOCUMENTS

| 5,698,212 A | 12/1997 | Hagiwara |
|---|---|---|
| 5,827,524 A | 10/1998 | Hagiwara |
| 5,914,356 A | 6/1999 | Erbe |
| 5,939,087 A | 8/1999 | Hagiwara |
| 6,071,542 A | 6/2000 | Tanimoto |

FOREIGN PATENT DOCUMENTS

| EP | 0732 052 | 9/1996 |
|---|---|---|
| JP | 1164721 | 6/1989 |
| JP | 3145410 | 6/1991 |
| JP | 6100329 | 4/1994 |
| JP | 7300339 | 11/1995 |
| JP | 10158037 | 6/1998 |
| JP | 11228173 | 8/1999 |
| WO | 96 21628 A | 7/1996 |
| WO | 00 76486 | 12/2000 |
| WO | WO 00/76486 | * 12/2000 |

* cited by examiner

*Primary Examiner*—Johann Richter
*Assistant Examiner*—Ernst V Arnold
(74) *Attorney, Agent, or Firm*—Michael J. Striker

(57) ABSTRACT

The method of protecting a polymeric plastic from attack by bacteria and fungi includes providing bioactive glass particles having a mean particles size preferably less than 2 μm as an additive incorporated into the polymeric plastic. The bioactive glass particles contain 40 to 60% by weight of $SiO_2$, 10 to 30% by weight of CaO, 10 to 35% by weight of $Na_2O$, 2 to 8 % by weight of $P_2O_5$, 0 to 25% by weight of $CaF_2$, 0 to 10% by weight of $B_2O_3$, 0 to 8% by weight of $K_2O$ and/or 0 to 5% by weight of MgO. The additive is included in amounts of up to 25% by weight in the polymeric plastic.

9 Claims, No Drawings

POLYMERS CONTAINING BIOACTIVE GLASS WITH ANTIMICROBIAL EFFECT

The invention relates to polymers containing an antibacterial and fungicidal bioactive glass as additive.

It is known that an antibacterial and fungicidal action can be achieved in polymers by the introduction of aluminosilicates, such as zeolites, cf. JP-A-3145410; JP-A-1164721, U.S. Pat. No. 6,071,542, JP-A-03145410, U.S. Pat. Nos. 5,698,212, 5,939,087, 5,827,524, EP-A-732052. The aluminosilicates contain small quantities of heavy metal ions with an antimicrobial action, such as Ag, Cu, Zn, Sn, Pb, Bi, Fe, Cr. The actual antibacterial action is in this case derived from the heavy metal ions which are introduced, the zeolite serving only as a matrix without having any antibacterial or fungicidal action of its own. Furthermore, it is known that an antimicrobial action can be achieved by introducing silver into glass, cf. JP10158037, JP6100329. Heavy metals (such as for example Ag, Cu, Zn, Sn, Pb, Bi, Fe, Cr) may cause reactions in the body, even reactions which are as serious as allergic reactions or damage to organs.

Organic, active, microbially acting compounds, such as triclosan (trichlorohydroxydiphenylether) or paraben (p-hydroxybenzoates) may likewise lead to health problems and allergic reactions. Moreover, organic compounds are difficult to fix locally.

Moreover, it is known that an antibacterial and fungicidal action can be achieved in polymers by the introduction of organometal substances. In this case, by way of example, organomercury and/or organocopper compounds are used; in about 70% of the products, the action is based on arsenic. These substances are harmful on account of the toxicological and ecological dangers which they present.

The object of the present invention is to provide an antibacterially and fungicidally acting additive for polymers without harmful side effects.

The object is achieved by a bioactive glass as additive for polymers, the bioactive glass containing
40 to 90% by weight of $SiO_2$,
4 to 45% by weight of CaO,
0 to 35% by weight of $Na_2O$,
2 to 16% by weight of $P_2O_5$,
0 to 25% by weight of $CaF_2$,
0 to 10% by weight of $B_2O_3$,
0 to 8% by weight of $K_2O$ and/or
0 to 5% by weight of MgO.

The bioactive glass according to the invention has an antibacterial and fungicidal action in plastics and is at the same time toxicologically harmless; in particular, the bioactive glass does not contain any toxic heavy metals.

It has emerged that a bioactive glass which contains substantially only $SiO_2$, $P_2O_5$, $Na_2O$ and CaO is a suitable additive for polymers. The bioactive glass satisfies the requirement of being toxicologically harmless, since it does not contain any heavy metals or organically active compounds whatsoever.

The glass composition influences the release of ions. Exchange of ions with the aqueous environment results in an antibiotic action which, depending on the ionic fraction, can be set from biostatic to biocidal. A possible sustained action should also be noted, since the release of the ions can be controlled by varying the glass composition.

A preferred configuration of the invention is a bioactive glass as additive for polymer, the bioactive glass containing
40 to 60% by weight of $SiO_2$,
10 to 30% by weight of CaO,
10 to 35% by weight of $Na_2O$,
2 to 8% by weight of $P_2O_5$,
0 to 25% by weight of $CaF_2$,
0 to 10% by weight of $B_2O_3$,
0 to 8% by weight of $K_2O$ and/or
0 to 5% by weight of MgO.

This glass composition, as an additive to polymers, achieves very good results in terms of the antibacterial and fungicidal action.

A further preferred configuration of the invention is a bioactive glass as an additive for polymers in which the glass particles have a mean particle size of less than 100 µm. This particle size increases the reactivity.

A particularly preferred configuration of the invention is a bioactive glass as additive for polymers in which the glass particles have a mean particle size of less than 5 µm. This particle size greatly increases the reactivity.

A very particularly preferred configuration of the invention is a bioactive glass as additive for polymers in which the glass particles have a mean particle size of less than 2 µm, preferably less than 1.5. This particle size increases the reactivity to a relatively great extent.

A further configuration of the invention is a bioactive glass as additive for polymers, in which the bioactive glass additionally contains $Ag^+$, $Cu^+$, $Cu^{2+}$ and/or $Zn^+$. With this composition, a synergistic enhancement of the biocidal action is obtained.

The invention also provides a polymer containing bioactive glass which, based on its total weight, contains 1 to 30% by weight of bioactive glass particles.

A preferred configuration of the invention is a polymer containing bioactive glass which, based on its total weight, contains 1 to 10% by weight of bioactive glass particles.

The invention also provides a polymer as carrier material for bioactive glass which, based on the total weight, contains 30 to 90% by weight of bioactive glass.

A preferred configuration of the invention is a polymer as carrier material which, based on the total weight, contains 30 to 50% by weight.

The invention also provides for the use of the bioactive glass as an antimicrobial polymer additive.

A preferred configuration of the invention is the use of the bioactive glass in the domestic sector, in packaging, in food processing, in sealing compounds, in clothing, in the medical sector, in the sanitary sector, in the automotive sector, in the construction sector and as a plastic coating or adhesive bonding.

In many application areas for polymers, an antibacterial and fungicidal action is desired, but this action should not generally be achieved by the use of toxic heavy metals. These include applications in the following fields: silicones used in the first-aid sector, in sealing compounds, polyacrylates in bottles for babies, in the food processing and packaging sector, in domestic goods, in the clothing sector, for medical applications, such as protective gloves, catheters or wound bandages, plastic coatings, such as for handles or wash basins, plastic brushes, such as toothbrushes, natural rubber, latex such as mattresses.

Abrasive applications, in which new surfaces containing bioactive glass are constantly created, are particularly advantageous. Applications in which the bioactive glass additive, in addition to the antimicrobial action, also has additional functions, such as that of a stabilizer for setting the mechanical properties, viscosity and during processing, are also advantageous.

Without thereby restricting the use of bioactive glasses in the polymer sector, there are polymers which are especially suitable for bioglass to be added to. These include in particular PGA biodegradable polymer, LGA biodegradable polymer, polyamides, polycarbonates, polyesters, polyimides, polyurea, polyurethanes, organic fluoropolymers, polyacrylamides and polyacrylic acids, polyacrylates, polymethacrylates, polyolefins, polystyrenes and styrene copolymers, polyvinyl esters, polyvinyl ethers, polyvinylidene chloride, vinyl polymers, polyoxymethylenes, polyaziridines, polyoxyalkylenes, polyethylene, synthetic resins (alkyl resins, amino resins, epoxy resins, phenolic resins, unsaturated polyester resins), electrically conductive polymers, high-temperature polymers, inorganic polymers, polyphenylene oxide, silicones or the biopolymers: collagen, fibrin, chitin, chitosan, cellulose, cellulose ester, cellulose ether, enzymes, gelatin, natural resins, nucleic acids, polysaccharides, proteins, silk, starch, wool.

The action of the bioactive glass in polymers is in the antibacterial and fungicidal field, in the setting of the viscosity, in the improvement to mechanical properties, as stabilizers and to protect the polymer from fungal attack and destruction of the polymer.

Bioactive glasses, unlike conventional glasses, are distinguished by the fact that they are reactive in an aqueous medium and can form a hydroxyl apatite layer at their surface.

If bioactive glasses come into contact with water or a body fluid, they are distinguished by special reactions, in which, in particular, inter alia sodium and calcium ions of the glass are replaced by $H^+$ ions from the solution in the form of a cation exchange reaction, with the result that a surface which includes silanol groups is formed, at which sodium hydroxide and calcium hydroxide accumulate. The increase in the hydroxide ion concentration at the glass surface leads to the siloxane compound being released and therefore to further silanol groups or to ion exchange possibilities.

The molar ratio of calcium oxide to phosphorus oxide is preferably >2 and in particular >3 and is preferably <30, in particular <20, ratios of <10 being particularly preferred.

Polymer additives which contain bioactive glass particles which include $SiO_2$, $CaO$, $Na_2O$, $P_2O_5$, $CaF_2$, $B_2O_3$, $K_2O$ and/or $MgO$ are particularly preferred.

In both of the types of bioactive glasses described above, the phosphorus oxide content is preferably at least 2% by weight, in particular at least 4% by weight.

Bioactive glass itself is a material which is approximately round, such as for example sand. Particles of this type may be of a size of up to approx. 0.5 to 1 mm but are preferably significantly smaller. Standard particle sizes are $\leq 400$ μm, and in particular $\leq 200$ μm, and particle sizes of $\leq 100$ μm, preferably $\leq 90$ μm, and in particular $\leq 60$ μm and $\leq 20$ μm, have proven particularly expedient. A preferred grain fraction has a diameter $d_{50}$ of $\leq 10$ μM, preferably $\leq 5$ μm, particularly preferably $\leq 2$ μm. The higher the ratio of surface area to weight or volume, the higher the antimicrobial action of the particles becomes.

Preferred plastics are all polymers in which the plastic itself is to be protected from attack from bacteria and fungi or is in contact with moisture and is to have a bacteriostatic, bactericidal and/or fungicidal action.

The antimicrobial polymer additive according to the invention is preferably present in an amount of up to 25% by weight, in particular up to 15% by weight, based on the polymer. However, upper limits of 10% by weight or 7% by weight are preferred, and 5% by weight is particularly preferred. Lower limits are 0.01% by weight, in particular 0.1% by weight, with 0.5% by weight or 1% by weight being particularly preferred as the lower active quantity.

The polymer can also be used as carrier material for bioglass. In this case, bioglass is present in the polymer matrix in an amount of from 10 to 90% by weight, preferably 30 to 70% by weight, 30-50% by weight being particularly preferred.

The desired antimicrobial action is achieved with the polymer additives according to the invention even without further additives, in particular without the addition of additives which release $Ag^+$, $Cu^+$, $Cu^{2+}$ and/or $Zn^+$. The antimicrobial action of the polymer additive according to the invention can be synergistically enhanced by the addition of further sterilizing and/or germicidal agents or of antibiotic agents.

The invention claimed is:

1. A polymer additive with antimicrobial action, said polymer additive comprising a polymeric carrier and from 30 to 90% by weight of bioactive glass particles with a mean particle size less than 2 microns, wherein said bioactive glass particles contain:

$SiO_2$ 40-60 wt. %
$CaO$ 10-30 wt. %
$Na_2O$ 10-35 wt. %
$P_2O_5$ 2-8 wt. %
$CaF_2$ 0-25 wt. %
$B_2O_3$ 0-10 wt. %
$K_2O$ 0-8 wt. %
$MgO$ 0-5 wt. %.

2. The polymer additive as defined in claim 1, containing from 30 to 50% by weight of said bioactive glass particles.

3. The polymer additive as defined in claim 1, wherein a molar ratio of calcium oxide to phosphorus oxide is greater than 2 and less than 10.

4. The polymer additive as defined in claim 1, wherein said polymeric carrier comprises a PGA biodegradable polymer, LGA biodegradable polymer, polyamide polymer, polycarbonate polymer, polyester polymer, polyimide polymer, polyurea polymer, polyurethane polymer, organic fluoropolymer, polyacrylamide polymer, polyacrylic acid polymer, polyacrylates polymer, polymethacrylates polymer, polyolefin polymer, polystyrene polymer, polystyrene copolymer, polyvinyl ester polymer, polyvinyl ether polymer, polyvinylidene chloride polymer, vinyl polymer, polyoxymethylene polymer, polyaziridine polymer, polyoxyalkylene polymer, polyethylene polymer, electrically conductive polymer, high-temperature polymer, polyphenylene oxide polymer, collagen, fibrin, chitin, chitosan, cellulose, cellulose ester, cellulose ether, enzyme polymer, polynucleic acid, polysaccharide, protein, silk polymer, starch polymer, or wool polymer.

5. A polymer additive with antimicrobial action, said polymer additive consisting of bioactive glass particles with a mean particle size less than 2 microns, wherein said bioactive glass particles contain:

$SiO_2$ 40-60 wt. %
$CaO$ 10-30 wt. %
$Na_2O$ 10-35 wt. %
$P_2O_5$ 2-8 wt. %
$CaF_2$ 0-25 wt. %
$B_2O_3$ 0-10 wt. %
$K_2O$ 0-8 wt. %
$MgO$ 0-5 wt. %.

6. The polymer additive as defined in claim 5, wherein a molar ratio of calcium oxide to phosphorus oxide is greater than 2 and less than 10.

7. A polymer containing 1 to 30% by weight of bioactive glass particles having antimicrobial action, wherein said bioactive glass particles have a mean particle size less than 2 microns and contain:
- 40 to 60% by weight of $SiO_2$,
- 10 to 30% by weight of CaO,
- 10 to 35% by weight of $Na_2O$,
- 2 to 8% by weight of $P_2O_5$,
- 0 to 25% by weight of $CaF_2$,
- 0 to 10% by weight of $B_2O_3$,
- 0 to 8% by weight of $K_2O$, and/or
- 0 to 5% by weight of MgO.

8. The polymer as defined in claim 7, containing from 1 to 10% by weight of said bioactive glass particles.

9. A method of protecting a plastic comprising a polymer from attack by bacteria and fungi, said method comprising including bioactive glass particles in said plastic as an antimicrobial additive, said bioactive glass particles having a mean particle size less than 2 microns and containing:
- 40 to 60% by weight of $SiO_2$,
- 10 to 30% by weight of CaO,
- 10 to 35% by weight of $Na_2O$,
- 2 to 8% by weight of $P_2O_5$,
- 0 to 25% by weight of $CaF_2$,
- 0 to 10% by weight of $B_2O_3$,
- 0 to 8% by weight of $K_2O$, and/or
- 0 to 5% by weight of MgO.

* * * * *